United States Patent [19]

Bachmann et al.

[11] 4,327,893

[45] May 4, 1982

[54] GUILLOTINE DAMPER

[75] Inventors: Lothar Bachmann, Auburn; John A. Powell, Yarmouth; Ralph W. Turner, Brunswick, all of Me.

[73] Assignee: Bachmann Industries, Inc., Lewiston, Me.

[21] Appl. No.: 154,476

[22] Filed: May 29, 1980

[51] Int. Cl.³ .............................................. F16K 39/04
[52] U.S. Cl. ................................... 251/159; 251/169; 251/174
[58] Field of Search ............... 251/159, 169, 170, 174; 137/546

[56] References Cited

U.S. PATENT DOCUMENTS

| | | | |
|---|---|---|---|
| 1,727,628 | 9/1929 | Baker | 251/159 X |
| 1,867,349 | 7/1932 | Brosius | 251/159 X |
| 2,251,481 | 8/1941 | Corbin, Jr. | 251/61 X |
| 2,253,888 | 8/1941 | Carlson | 137/546 X |
| 2,702,178 | 2/1955 | Scholl | 251/159 X |
| 3,007,490 | 11/1961 | Passmore | 251/159 X |
| 3,109,457 | 11/1963 | Oliveau | 251/159 X |

FOREIGN PATENT DOCUMENTS 2535629  2/1977  Fed. Rep. of Germany ...... 251/159

*Primary Examiner*—Arnold Rosenthal

[57] ABSTRACT

A guillotine damper for a duct is provided with a thrust frame upstream of the path of a blade that is movable into and out of an operative position in sealing engagement with a seat downstream of the blade path when the flow path is not obstructed by the blade and in sealing engagement with and seating the blade against the seat when the blade is positioned to block the duct. Devices are provided with each utilizing resilient components to thrust the frame into its sealing positions and a hydraulic component to retract the frame when the blade is to be moved into or out of its duct blocking position. Each device exerts the force of either component to the frame through a series of mechanical elements spaced a substantial distance apart along the sides of the frames and connected thereto.

15 Claims, 9 Drawing Figures

Fig. 2
Fig. 3
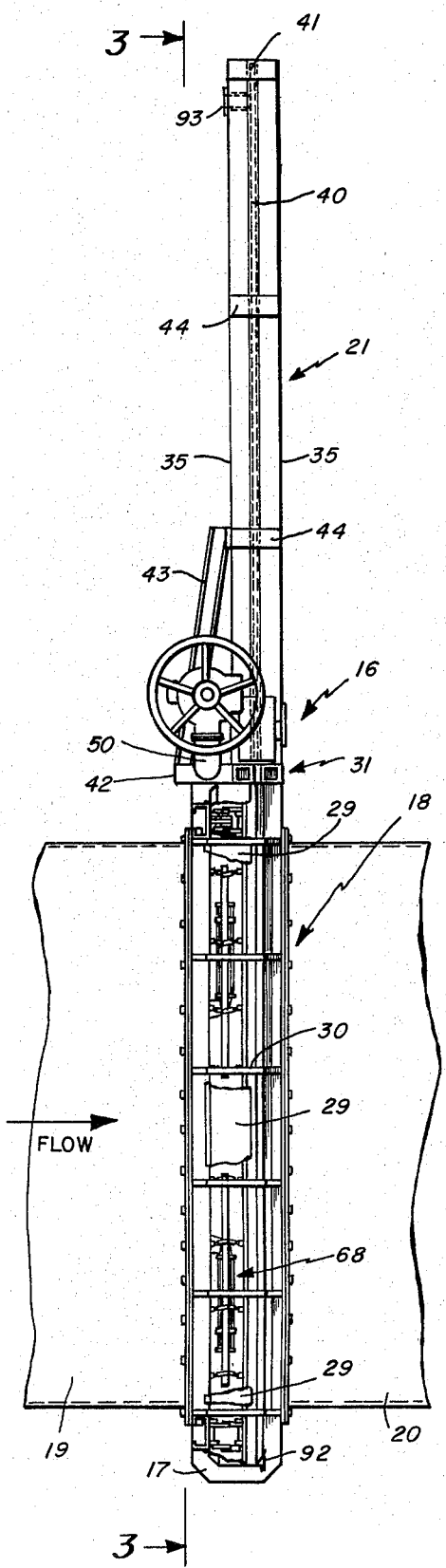
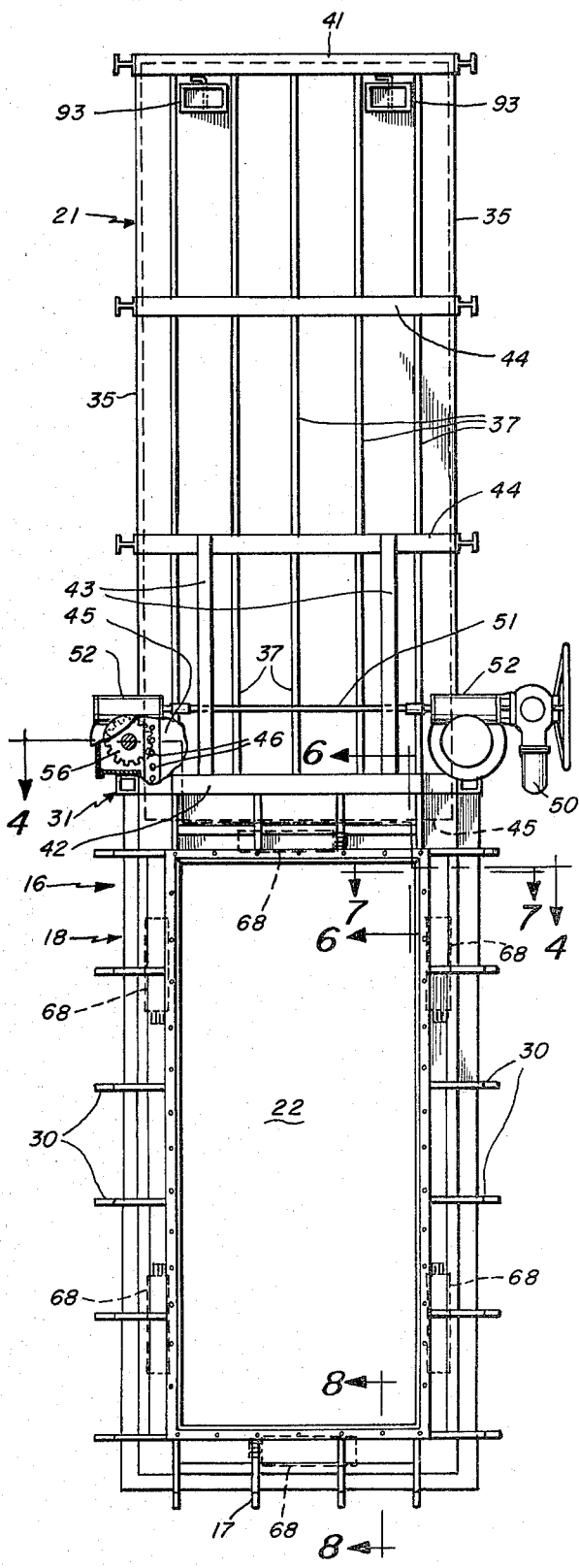

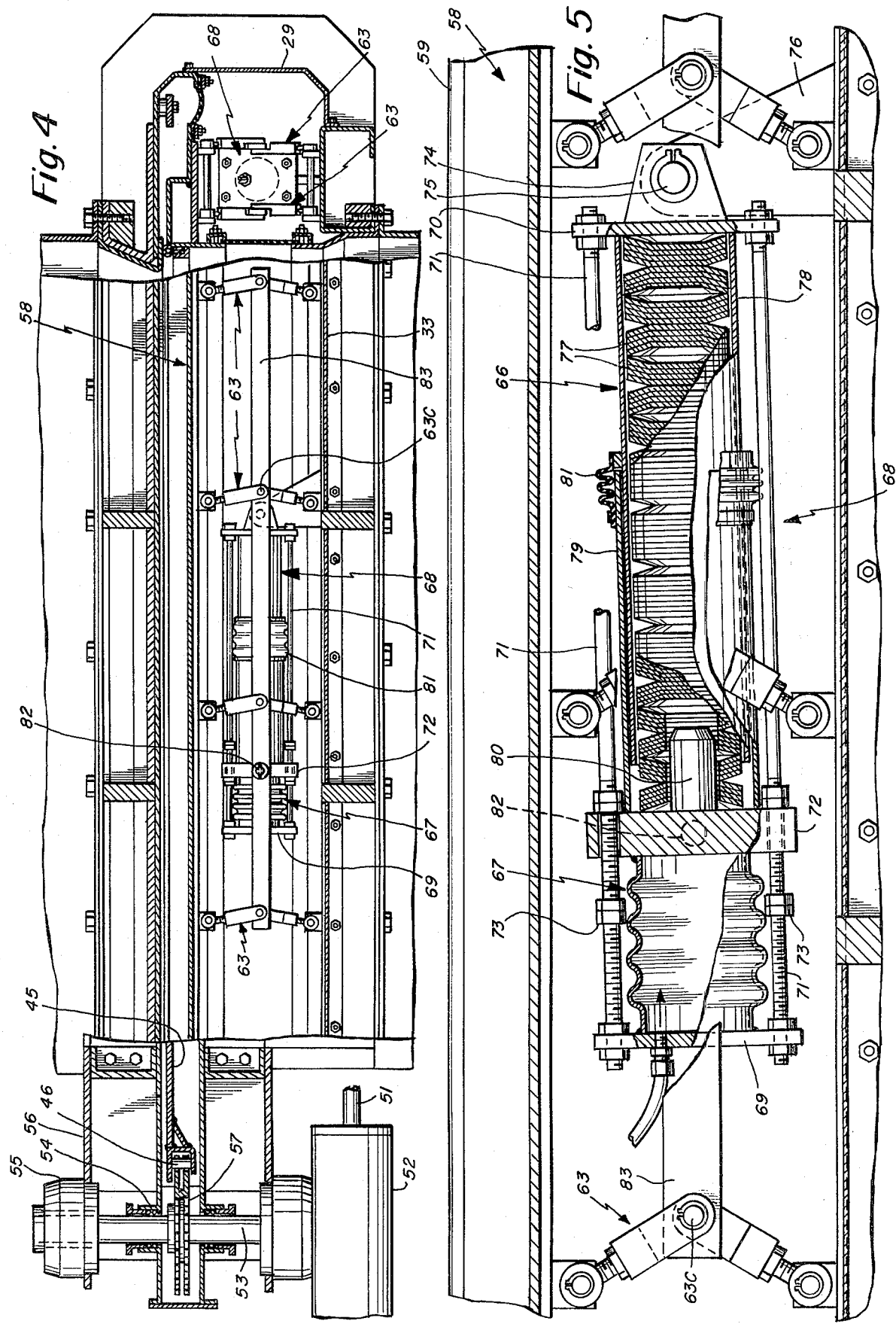

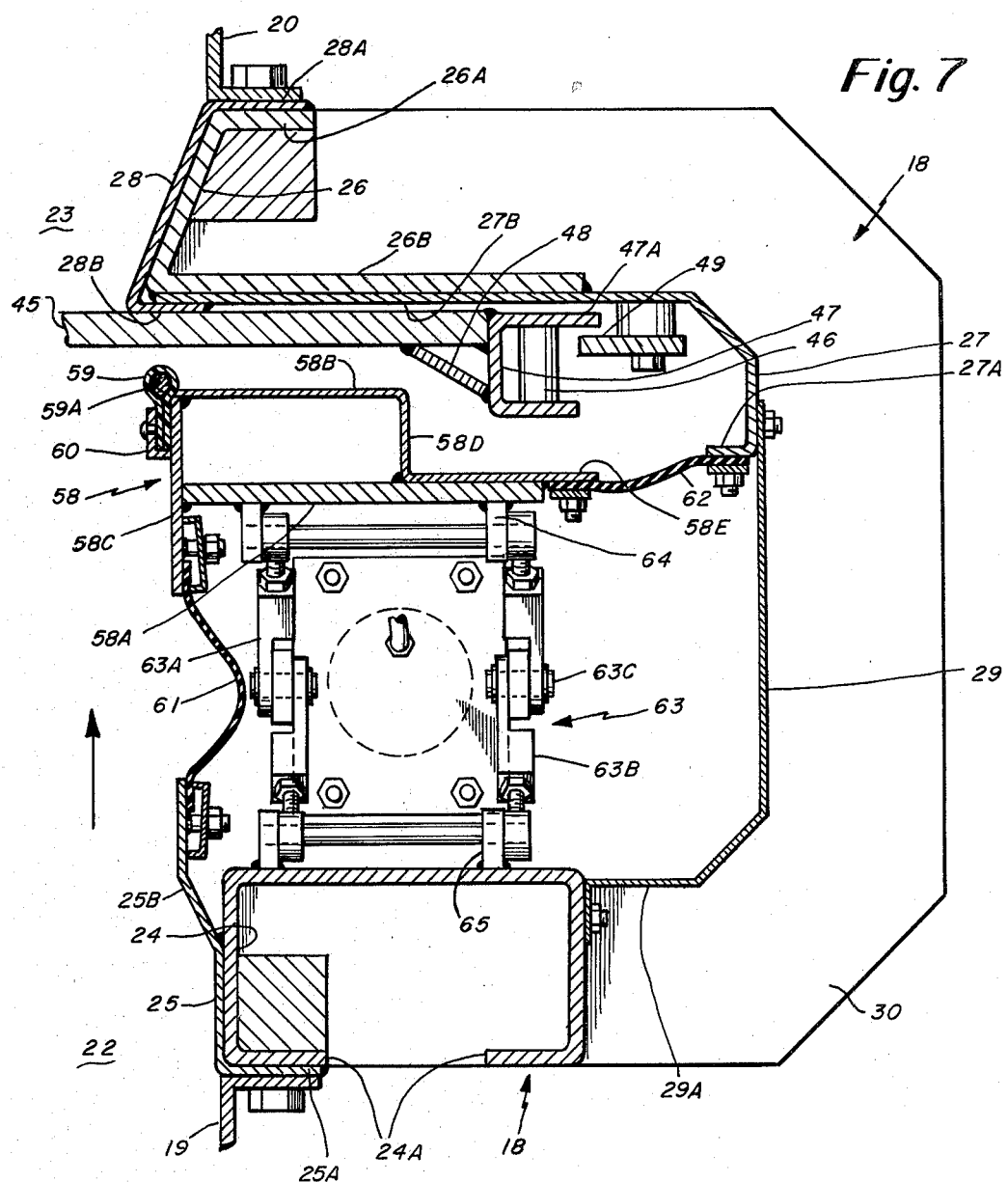

GUILLOTINE DAMPER

BACKGROUND OF THE INVENTION

Guillotine dampers are used wherever provision must be made to block the flow of exhaust gases through such ducts as those of coal fired electric utility power plants. When such ducts are equipped with gas scrubbers, for example, provision must be made for the servicing without shutting down the boilers. To that end, such ducts are provided with parallel sections in each of which a scrubber is located.

As the servicing of equipment in such duct sections requires the entry of personnel therein, it is essential that they be protected from flowing duct contents by isolating the work area both upstream and downstream thereof as by guillotine dampers.

A guillotine damper has a chamber through which upstream and downstream duct sections are connected. A blade is mounted within the chamber for movement between a first position in which flow through a duct section is unobstructed and a second position in which it blocks the flow. Means are provided to seal the path of the blade when the blade is in its first position and to seal the blade against leakage about its margins when the blade is in its second position.

When the sealing means rely on a constant flow of air under pressure or when seals are frictionally receptive or margins of the blade, the sealing means have not proved to be reliable as in the former case large volumes of air are required and any loss of power results in leakage. Seals engaged by a moving blade are easily damaged with leakage resulting or such seals become ineffective if they become encrusted. Guillotine dampers relying on sealing means of the above types are not adapted for use where zero leakage is a requirement.

An effective construction for sealing purposes is to provide a seat on the downstream side of the blade path and a pressure frame on the upstream side thereof that is provided with a seal engageable with the seat of the blade and movable between a position effecting such sealing engagement into a position enabling the blade to be shifted from one position to the other. To effect such movements of the thrust frame, fluid pressure operated means have been employed to move the pressure frame against the resistance of springs by which thrust frame retraction was effected into operative positions in which it is either held sealed against the seat or the blade and the blade is held against the seat.

In order to avoid the use of energy to maintain the pressure frame in its operative positions, guillotine dampers have had movements of their pressure plates into their operative positions effected by resilient means typically spring packs with frame retraction effected by fluid pressure operated devices with a consequential saving in energy since frame retraction is necessary only when the blade is to be moved from one position to the other. One construction utilized a substantial number of spring packs arranged in closely spaced pairs along the sides of the frame with a retraction jack between each two spring packs.

THE PRESENT INVENTION

The general objective of the present invention is to provide a guillotine damper of the type utilizing resilient means to effect the sealing positions of the thrust frame and fluid pressure operated means to effect frame retraction on a basis effectively sealing the blade or the blade path to ensure zero leakage by mechanical means.

In accordance with the invention, this objective is attained by the use of devices supported by wall structure of the damper upstream of the blade path with each device provided with a series of spaced mechanical elements pivotally connected to that wall structure and to the frame, the elements of a type movable in one direction to effect frame thrusting and in the other retraction of the frame. Each device also includes first and second means to actuate the elements, the first means resilient and normally urging said elements to thrust the frame into sealing engagement with a seat downstream of the blade path or into sealing engagement with the blade in the second position thereof. The second means is of a fluid pressure operated type with valve controlled means operable to deliver thereto fluid under pressure adequate to overcome the resistance of the resilient means and retract the frame out of the blade path with the resilient means becoming again operative on the relief of the second means from the operating pressure.

Another objective of the invention is to ensure that adequate sealing pressure is applied by the thrust frame, an objective attained by utilizing toggle joints as the elements of each device thus to enable the thrust pressure exerted by the resilient means to be applied to the frame with substantial mechanical advantage.

Yet another objective of the invention is to provide that the first and second means are easily installed and the mechanical elements readily connected thereto, an objective attained with the first means a spring pack and the second means of the bellows type with the two means joined as a unit in opposing relationship on opposite sides of a plate movable by either of them and connected to the associated elements to effect their movements.

Another objective of the invention is to provide for the venting of the chamber when it includes a closed bonnet in which the blade is housed when in its first position, an objective attained with normally closed inlet ports in the lower part of the chamber but outside the position of the frame when sealed against the seat and normally closed ports in the upper part of the bonnet that are so located as not to be blocked by the blade when housed within the bonnet.

Other objectives, novel features, and advantages of the present invention will be apparent from the drawings, the following description thereof and the appended claims.

BRIEF DESCRIPTION OF THE DRAWINGS

The accompanying drawings illustrate a preferred embodiment of the invention of which—

FIG. 2 is a side view of a guillotine damper in accordance with the invention;

FIG. 3 is an end view thereof taken along the indicated line 3—3 of FIG. 2;

FIG. 4 is a section, on an increase in scale, taken approximately along the indicated line 4—4 of FIG. 3;

FIG. 5 is a section, on an increase in scale lengthwise of the thrust frame actuating device shown in FIG. 4;

FIG. 7 is a like section taken approximately along the indicated line 7—7 of FIG. 3;

THE PREFERRED EMBODIMENT OF THE INVENTION

Guillotine dampers are used in the duct work of coal fired, steam operated generating plants, paper mills, and cement and incinerator plants as an examples of exhaust systems incorporating gas processing equipment of which gas scrubbers are an important example.

Figure 1:
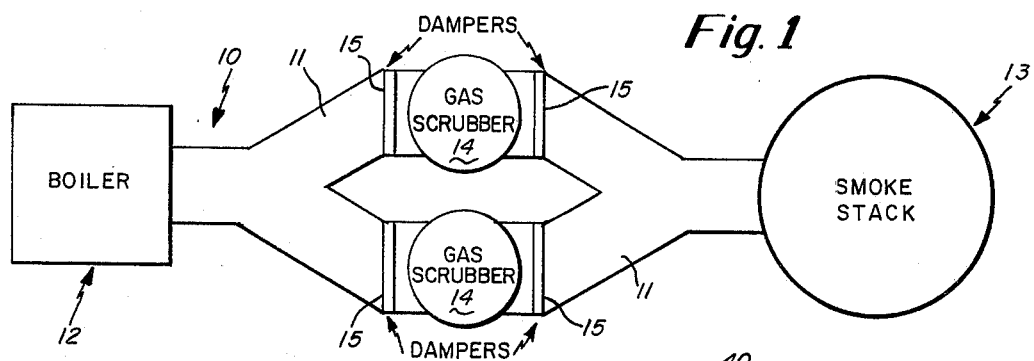
FIG. 1 is a schematic view illustrating a divided duct with each branch equipped with dampers enabling the gas scrubber between them to be isolated.

In order that such equipment may be serviced without requiring a shut down, the duct work, generally indicated at 10 and shown schematically in FIG. 1 on a much simplified basis, includes parallel branches 11 between the boiler 12 and the stack 13 with each branch equipped with a gas scrubber 14. With a guillotine damper 15 installed upstream and downstream of each gas scrubber 14, that gas scrubber may be safely serviced if the associated dampers 15 are capable of so preventing leakage that the gas scrubber is completely isolated.

Guillotine dampers in accordance with the present invention are well adapted for use in duct work to isolate gas processing equipment, particularly gas scrubbers, where zero leakage must be assured. Such a guillotine damper is generally indicated at 16 in FIGS. 2 and 3 and is in the form of a chamber supported by a base 17 and including a main section, generally indicated at 18 to which flanged ends of upstream and downstream duct sections 19 and 20, respectively, are secured. The chamber also includes and air tight bonnet section, generally indicated at 21.

Figure 6:
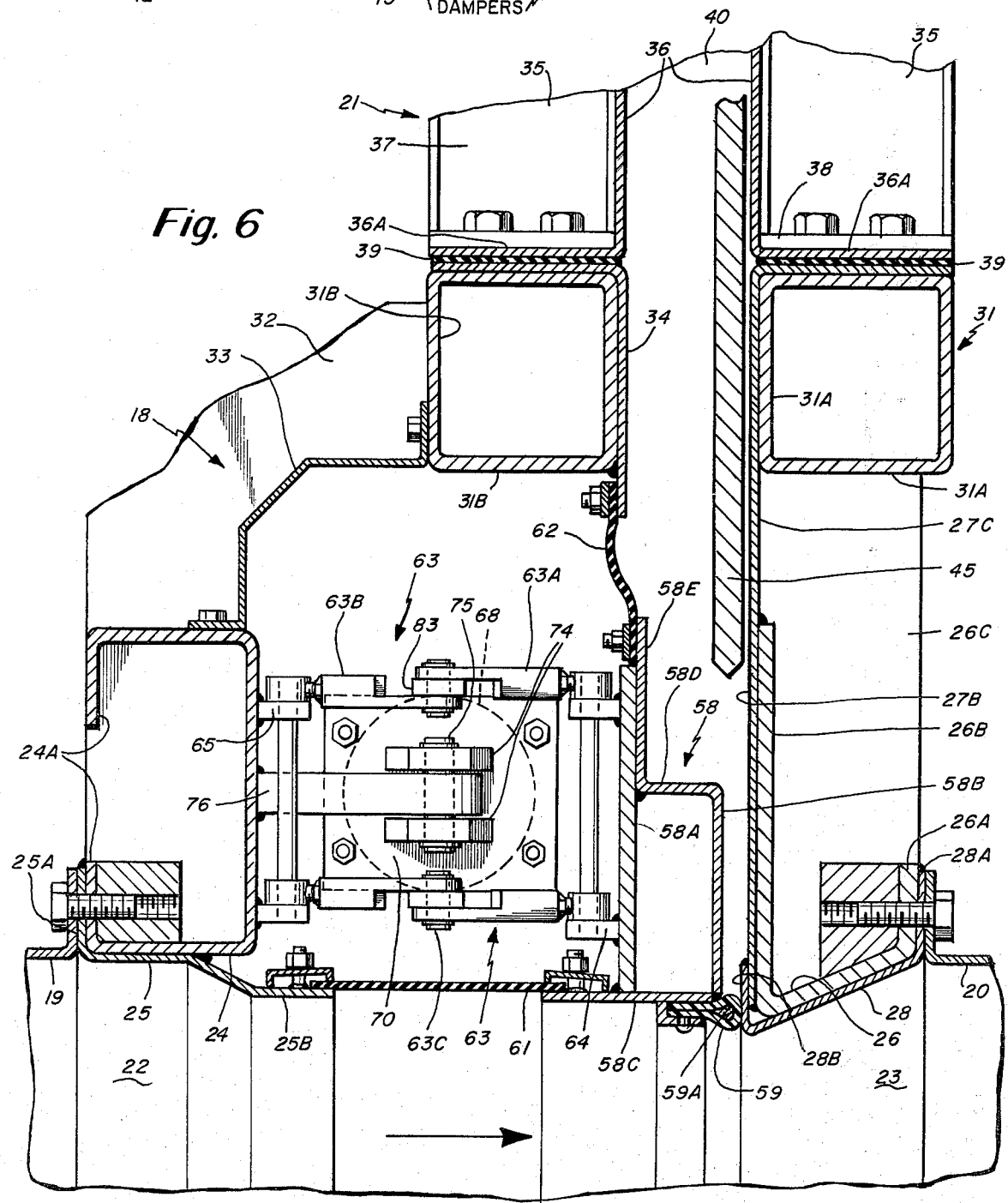
FIG. 6 is a fragmentary section, on a further increase in scale, taken approximately along the indicated line 6—6 of FIG. 3.
Figure 8:
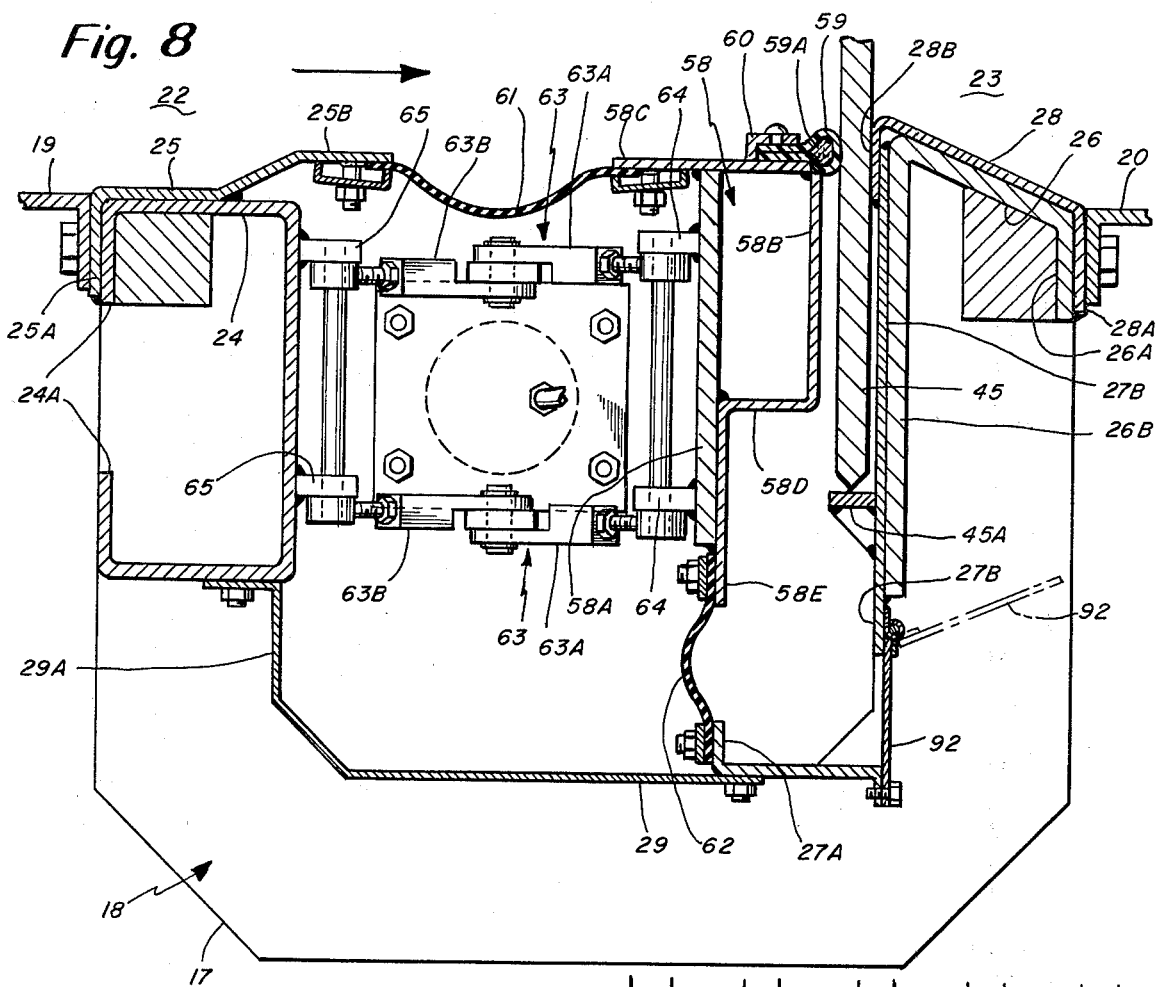
FIG. 8 is another like section taken approximately along the indicated line 8—8 of FIG. 3.

The main section 18, see FIGS. 6, 7, and 8, has front or upstream and a rear or downstream wall structure forming gateways 22 and 23, respectively, that are rectangular and of the size and shape of the duct sections. The upstream wall structure consists of a frame 24 defining the gateway 22 of channel stock having inturned flanges 24A. A frame 25 of corrosion resistant alloy, in practice nickel alloy, is welded to the inner walls of the frame 24 and has a flange 25A welded to the frame flange 24A and a free, downstream end section 25B extending beyond the frame 24 and inwardly offset relative thereto. The flanged end of the duct section 19 is bolted to the flange 24A through the flange 25A.

The downstream wall structure includes a frame 26 establishing the gateway 23 and formed with an outer offset flanged end 26A and an inner flanged end 26B of substantial extent. A downstream housing section 27, see FIGS. 7 and 8, has a flanged inner end 27A and an outer end wall 27B welded to the inner surface of the frame flange 26B. A frame 28 of nickel alloy is welded to the frame 26 and has an outer flange 28A overlying and welded to the flange 26A and an inner flange 28B overlying the inner margin of the inner flange 26B and welded to the housing end wall 27B. The flange 28B constitutes a seal seat. An upstream housing section 29 is bolted to the housing section 27 and has a flanged front wall 29A bolted to the sides and bottom of the frame 24. Spaced reinforcements 30 also interconnect the upstream and downstream wall structures.

The sides of the downstream frame 26 are connected as at 26C, see FIG. 6, to a frame, generally indicated at 31 which has parallel beams 31A and 31B. The outer end wall 27B of the housing section 27 has an upper end section 27C welded to the inner and top surfaces of the beam 31A. The top of the frame 24 is connected by braces 32 to the beam 31B. A housing cover 33 is attached to the top of the frame 24 and the beam 31B. The inner and upper faces of the beam 31B have a protective sheet 34 of a non-corrosive alloy welded thereto.

The bonnet section 21 includes spaced apart, upstream and downstream portions with each portion having end channel members 35 welded to the appropriate one of the beams of the frame 31 with a wall 36 of a non-corrosive alloy or of stainless steel secured thereto and to vertical reinforcements 37. The bottom edge 36A of each wall 36 extends at right angles to overlie the appropriate beam of the frame 31. A holddown strip 38 overlies the wall edge 36A and is connected therethrough and through a seal 39 to the subjacent beam. The space between the two bonnet portions is closed by side walls 40 and the upper end of the bonnet section 21 is closed by a cap 41. The frame 31 supports a platform 42 connected by braces 43 to the lowermost one of vertically spaced reinforcements 44 which interconnect the bonnet portions. The sides of the frame 24 extend beyond the top thereof in support of the platform.

A blade or gate 45 within the damper 16 has a rack 46, see FIGS. 3, 4, and 7, extending along each side edge. Each rack 46 includes a U-shaped holder 47, best seen in FIG. 7, welded to the blade and braced as at 48. The wall 47A of each holder is loosely confined by retainers 49 spaced vertically along the inner surface of the end wall 27B of the housing section 27 thus to hold the blade close to the seat 28B but free to be moved a short distance towards and away therefrom.

A reversible drive motor 50, in the disclosed embodiment a hydraulic motor, is mounted on one end of the platform 42, see FIGS. 2, 3, and 4, and drives a shaft 51 common to the two gear boxes 52 each of which is located adjacent opposite ends of the platform with its driven shaft 53, see FIG. 4, extending through seals 54 carried by the walls 36 of the bonnet and by bearings 55 held in mounts 56. The shafts 53 are provided with pinions 57 in mesh with the appropriate one of the racks 46.

By means of such a drive or other suitable drive, the blade 45 is moved along a vertical path transversely of the gas flow path through the chamber between a first position within the bonnet section 21 in which the flow path is unblocked and a second position blocking flow through the gateway 23 with its bottom edge seated on the blade stop 45A, see FIG. 8.

In order that the blade 45, when in its second position will be operative to block the flow of gas through the gateway 23 and in order that gas cannot escape from the flow path when the blade 45 is in its first position within the bonnet section 21, a thrust frame generally indicated at 58 is provided on the upstream side of the path of the blade 45 and supported by means presently to be described by which it may be moved towards and away from the seat 28B. The frame 58 is provided with a seal 59 held in a socket 60 attached to and extending about the inside surface of the frame 58 and protruding beyond the plane of the front wall of the frame for sealing contact with the seat 28B or with the blade 45. A seal 59 is formed as by folding a strip about an asbestos core 59A with the ends of the strip locked in the socket 60. The strip from which the seal is formed is, for example, a lamination of asbestos of glass fabrics reinforced elastomer layers that provide a seal that is sufficiently deformable under sealing pressures to seal about any encrusted area or areas on the seat 28B.

The thrust frame 58 includes a rear wall 58A and a front wall 58B spaced therefrom but connected thereto by inner and outer side walls 58C and 58D, respectively. The front wall 58B and the side wall 58D may be of stainless steel but the side wall 58C is, in the disclosed embodiment, of nickel alloy. The side wall 58C to which the seal 59 is secured extends beyond the rear wall 58A to which it is welded with its extremity connected to the extremity 25B of the upstream frame 24 by a flexible seal 61. The side wall 58D is welded to the rear wall 58A and has a section 58E overlying the rear wall and extending beyond it with its extremity connected to the flange 27A of the housing section 27 by a flexible seal 62. The seals 61 and 62 are of materials adapted to withstand abrasion and the temperatures of and the corrosive attacks of the flue gases and may be of the type consisting of layers of asbestos or glass fiber fabrics with elastomeric, stainless steel, or nickel alloy reinforcements as required to ensure long life.

In accordance with the present invention, the thrust frame 58 is supported at spaced intervals by toggle joints, generally indicated at 63 with one arm 63A of each toggle joint pivotally connected to ears 64 on the rear wall 58A of the thrust frame and the other arm 63B pivotally connected to ears 65 on the proximate face of the frame 24 of the upstream wall structure.

The toggle joints 63 are also components of devices by which either the seal 59 is held under substantial pressure against the seat 28B or against the thrust frame 58 to hold it against the seat or forcibly withdraw the thrust frame from the path of the blade 45 when the blade is to be moved from one position to the other. The devices are provided with means to effect such thrust frame movements, such means including resilient means normally operable to position and hold the thrust frame in an operative position and hydraulically operated means to retract the pressure frame.

One resilient means, generally indicated at 66, and one hydraulically operated means, shown as a bellow 67 effect the simultaneous movement of a series of toggle joints, in the disclosed embodiment, a series of four such joints. These are combined as a single unit, generally indicated at 68 in opposition to each other.

Each unit 68, see FIG. 5, has end plates 69 and 70 interconnected by a series of tie rods 71 which slidably support an intermediate plate 72. A bellows 67 is confined between the end plates 69 and the intermediate plate 72 and the movement of the intermediate plate 72 towards the end plate 69 is limited by steps 73 adjustably threaded on the tie rods. A resilient means 66 is confined between the end plate 70 and the intermediate plate 72. The end plate 70 of each unit 68 has ears 74 connected by a pivot 75 to an ear 76 fixed on the frame 24.

Each resilient means 66 includes groups of parallel spring washers 77, in practice four spring washers in each group with the groups arranged in series. It will be appreciated that the number of spring washers 77 in each group and the number of groups employed depends on the wanted pressure that is to be exerted by each device. The resilient means 66 includes a housing 78 fixed on the end plate 70 which is dimensioned to hold the stacked spring groups in position and to slidably enter a housing 79 fixed on the intermediate plate 72 which is provided with a centering pin 80 holding centered the groups of washers that are within the slightly oversized housing 79. A boot 81 seals the gap between the two housing sections 78 and 79.

The intermediate plate 72 has oppositely disposed pivots 82, one for each series of toggle joints 63 and in support of a connecting rod 83 which receives the pivot 63C of each toggle joint that connects the proximate ends of its arms 63A and 63B. In the disclosed embodiment the toggle joints are arranged with one spaced from the end of each unit that houses the resilient means and with two joints spaced from each other and from the other end thereof.

It is desired that the travel of the thrust frame 58 be short, approximately one and one-half inch by way of example and not of limitation. Each resilient means 66 must be capable of exerting a sealing pressure which may be as high as 1,500 lbs. p.s.i. or higher in the case of some installations. The toggle joints are spaced as required. In the disclosed embodiment, the toggle joints may be spaced apart a distance in the eighteen to twenty-four inch range by way of example and not of limitation. The disclosed embodiment has gateway dimensions of seven feet by fourteen feet with one device at the top, one device at the bottom and two devices at each side.

Figure 9:
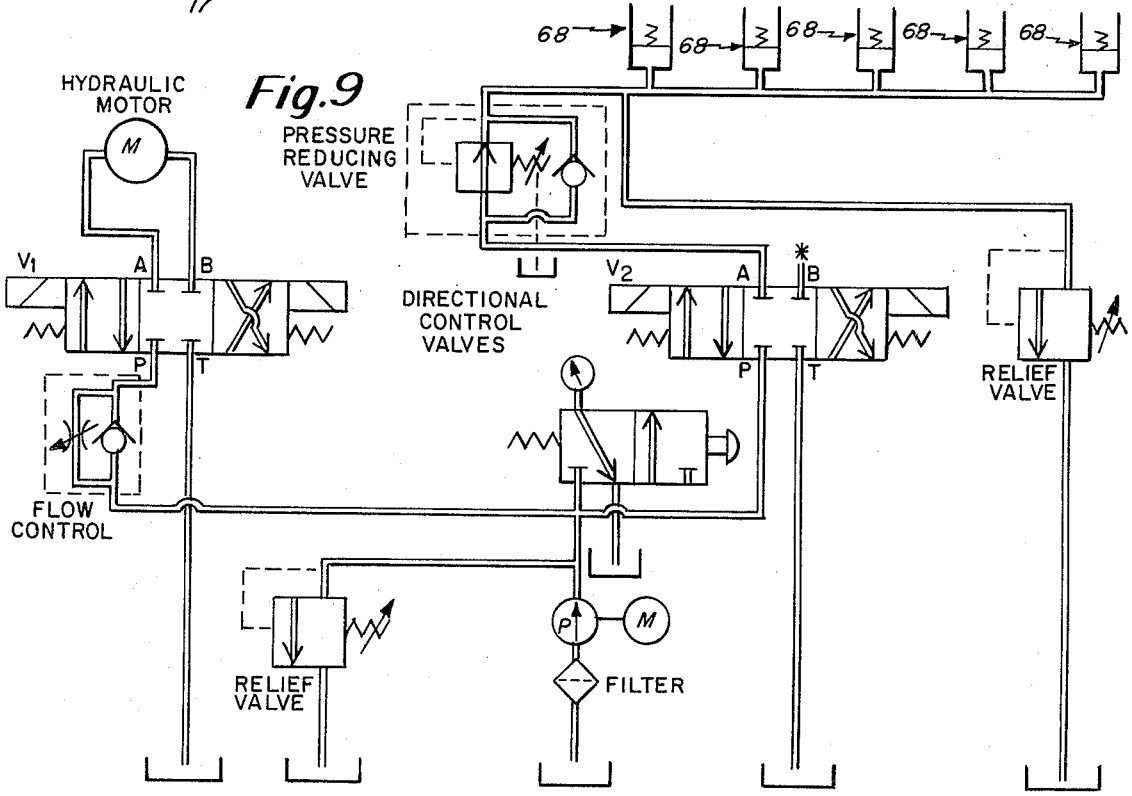
FIG. 9 is a schematic view of the hydraulic system.

Turning now to the hydraulic system by which the bellows 67 are subjected to or relieved by operating pressures, reference is made to FIG. 9. A motor driven pump 83 is operable to deliver oil under a predetermined pressure through a conduit 84 provided with a control valve 85, a pressure regulator 86 and a manifold 87 with which each bellows 67 is in communication when the valve 85 is set for the purpose of retracting the thrust frame 58.

The pump 83 is also operable to deliver oil under a controlled pressure through a flow control 88 and a valve 89, when appropriately set, to the hydraulic motor 50 and thence through the return line 90 back to source. The valve 89 is also capable of being set to drain the motor 50. When the blade 45 has been moved from one position to the other, the valve 85 is shifted to relieve the several bellows of operating pressure and return the oil through the line 91 to source. Should the thrust frame 58 be stuck, the pressure regulator 86 may be adjusted to increase the retracting force.

It will be noted from FIGS. 2 and 3 that at each side and adjacent the bottom of the main section 18 of the damper, there are normally closed ports 92 and normally closed ports 93 at each side of and adjacent the upper end of the bonnet section 21. When the thrust frame 58 is operatively positioned, the spaces surrounding the then sealed flow path may be vented by opening the ports 92 and 93.

We claim:

1. A damper for use in blocking the flow of fluid through a duct, said damper including a chamber to which upstream and downstream duct sections are to be connected and provided with interconnected upstream and downstream wall structures, a blade mounted within said chamber for movement between a first position in which the flow path through the chamber is unobstructed and a second position in which the flow path is blocked, means operable to move said blade between said positions, the downstream wall structure including a seat continuously surrounding the flow path, a thrust frame within said chamber on the upstream side of the blade path and including a seal for continuous engagement with said seat or the blade, and means operable to move said frame between a first operative position in which the seal is in engagement with the seat or the blade when in the second position thereof and a second position in which the seal is out of the blade path, said means including a series of actuating devices spaced apart in a transverse plane about the flow path, each device including a series of spaced toggle joints pivotally connected to the upstream wall structure and said frame, resilient means, fluid pressure operated means, means combining said fluid pressure operated means and said resilient means as a unit but in opposition to each other and including a common connection with said series of toggle joints, each unit mounted on said upstream structure and so disposed that the forces exerted by the opposing means thereof are in directions parallel to the blade path, said resilient means so actuating said toggle joints as to thrust said frame into the first position thereof, and valve controlled means operable first to deliver fluid to each fluid pressure operated means under an operating pressure effective to overcome the resistance of said resilient means thereby to retract said frame to establish the second position thereof and then to relieve said fluid pressure operated means of said operating pressure.

2. The damper of claim 1 in which each unit is so disposed that the forces exerted by the opposing means thereof are in directions parallel to the path of the blade and the series of means of each device are toggle joints.

3. The damper of claim 2 in which each unit includes a plate between the opposing means and movable by either of them, and an actuator pivotally connected to the toggle joints and to said plate.

4. The damper of claim 1 in which each device includes two spaced series of toggle joints, the unit of each device includes a plate between the opposing means and the connecting means of each series of joints is an actuator pivotally connected to the toggle joints of each series and to a side of said plate opposite to the other actuator.

5. The damper of claim 1 in which the fluid pressure operated means of each device is a bellows and the fluid delivery means is a hydraulic system and the blade moving means includes a hydraulic motor and valve controlled means incorporating said motor in said hydraulic system.

6. The damper of claim 1 in which the resilient means includes a substantial number of spring washers consisting of a plurality of groups of washers arranged in parallel, the groups are arranged in series, and means holding the groups in the form of a stack while permitting the groups to flex.

7. The damper of claim 1 in which each unit includes end plates and an intermediate plate, tie rods interconnecting said end plates and slidably supporting said intermediate plate for limited movement relative to said end plates, the fluid pressure operated means between said intermediate plate and one end plate and the resilient means between said intermediate plate and the other end plate, and the connecting means are connected to said intermediate plate.

8. The damper of claim 7 in which the mechanical elements are toggle joints, and the connecting means is pivotally connected to the knee pivot of each joint.

9. The damper of claim 8 in which at least one toggle joint is spaced from each end of each unit.

10. The damper of claim 8 in which said other plate of each unit and the proximate face of the intermediate plate include housings, the housing of the intermediate plate extending freely within the end plate housing, a flexible seal interconnects the two housings, and the resilient means are within said housing.

11. The damper of claim 7 in which each tie rod includes a fixed stop against which the intermediate plate is seated by the resilient means.

12. The damper of claim 1 in which the portion of the chamber in which the blade is located in the first position thereof is a closed bonnet and the chamber has normally closed ports located adjacent the bottom thereof and adjacent the upper end of the bonnet to enable the space within the chamber surrounding the flow path to be vented when the thrust frame is operatively positioned.

13. The damper of claim 1 in which a flexible seal surrounds the flow path and is connected to the thrust frame and the inner margins of said upstream wall structure, a flexible seal surrounds said frame and is connected thereto and to said downstream wall structure, and the connection between said structure is a protective outer wall.

14. A damper for use in blocking the flow of fluid through a duct, said damper including a chamber to which upstream and downstream duct sections are to be connected and provided with interconnected upstream and downstream wall structures and a closed bonnet, a blade mounted within said chamber for movement between a first position within the bonnet with the flow through the chamber unobstructed and a second position in which the flow path is blocked, and downstream wall structure including a seat continuously surrounding the flow path, a frame within said chamber on the upstream side of the blade path and including a seal for continuous engagement with said seat, said chamber including portions spaced from and surrounding said frame and joined to the bonnet on the upstream side thereof, and means within said chamber operable to move said frame between a first operative position in which the seal is in engagement with the seat or with the blade in the second position thereof and a second position in which the seal is out of the blade path, a flexible seal between said frame and said upstream wall structure, a flexible seal between the sides and bottom portions of said frame and said bonnet on the upstream side thereof and said chamber portions, said seals dimensioned to be effective in either of said positions and said second named seal establishing with downstream chamber portions downstream wall structures a substantially U-shaped space in the chamber opening into said bonnet, both of said seals isolating the frame moving means from the flow path, and means operable to vent said chamber space and said bonnet when either said blade or said blade is sealed.

15. The damper of claim 14 in which the venting means includes normally closed ports adjacent both the bottom of the chamber and the upper end of the bonnet.

* * * * *